United States Patent
Tan et al.

(10) Patent No.: US 10,952,050 B2
(45) Date of Patent: Mar. 16, 2021

(54) INTELLIGENT MULTI-CHANNEL WIRELESS DATA ACQUISITION GATEWAY

(71) Applicant: Archimedes Controls Corp., Pleasant Hill, CA (US)

(72) Inventors: Liangcai Tan, Dublin, CA (US); Wenli Yu, Pleasanton, CA (US); Xin Hu, Dublin, CA (US)

(73) Assignee: Archimedes Controls Corp., Pleasanton, CA (US)

( * ) Notice: Subject to any disclaimer, the term of this patent is extended or adjusted under 35 U.S.C. 154(b) by 0 days.

(21) Appl. No.: 15/381,987

(22) Filed: Dec. 16, 2016

(65) Prior Publication Data

US 2017/0180913 A1   Jun. 22, 2017

Related U.S. Application Data

(60) Provisional application No. 62/269,908, filed on Dec. 18, 2015.

(51) Int. Cl.
  *H04L 29/08* (2006.01)
  *H04W 4/70* (2018.01)
  (Continued)

(52) U.S. Cl.
  CPC ............. *H04W 4/70* (2018.02); *G08C 17/02* (2013.01); *H04L 61/6081* (2013.01);
  (Continued)

(58) Field of Classification Search
  CPC .......... H04W 4/70; H04W 88/16; H04Q 9/00; H04L 67/1095; H04L 61/6081;
  (Continued)

(56) References Cited

U.S. PATENT DOCUMENTS 7,194,337 B2    3/2007  Sharma et al.
8,279,810 B1 *  10/2012 Li ........................... H04L 67/12
                                                            370/328
(Continued)

FOREIGN PATENT DOCUMENTS

CN         104468717 A  *  3/2015

OTHER PUBLICATIONS

Machine Translation for CN104468717, Wang: "Internet of Things sensor gateway data collecting and analyzing platform", Nov. 7, 2014 (Year: 2014).*
(Continued)

*Primary Examiner* — Ramy M Osman
(74) *Attorney, Agent, or Firm* — King & Spalding LLP

(57) ABSTRACT

The present invention is an intelligent gateway which can receive multiple sensor data using sub-1G Hz frequency, analyze data, and transmit processed data to a database server. The intelligent gateway can receive data from up to 100 sensors using sub-1G Hz (433, 868 or 915 MHz) wireless frequency. The received data can be analyzed and the gateway can determine when to transmit data, and which packaged data to transmit to the database server. The intelligent gateway can also receive feedback and instructions from the database server. The process data can be transmitted to the database server with different protocols like WIFI, Ethernet and RS485. The intelligent gateway can also include multiple sensors including temperature and humidity sensors, pressure sensors, air speed sensors and a particulate matter sensor for detecting particulates of less than 2.5 micro meters (PM2.5). These sensors are collect additional indoor environmental quality parameters.

14 Claims, 4 Drawing Sheets

(51) Int. Cl.
*H04L 29/12* (2006.01)
*H04Q 9/00* (2006.01)
*G08C 17/02* (2006.01)
*H04W 88/16* (2009.01)

(52) U.S. Cl.
CPC .......... *H04L 67/1095* (2013.01); *H04L 67/12* (2013.01); *H04L 67/125* (2013.01); *H04Q 9/00* (2013.01); *H04W 88/16* (2013.01)

(58) Field of Classification Search
CPC ....... H04L 67/12; H04L 67/125; H04L 12/66; G08C 17/02
See application file for complete search history.

(56) References Cited

U.S. PATENT DOCUMENTS

| | | | | |
|---|---|---|---|---|
| 8,760,293 | B2* | 6/2014 | Steiner | H05B 47/11 340/545.3 |
| 9,445,270 | B1* | 9/2016 | Bicket | H04L 12/66 |
| 9,986,411 | B1* | 5/2018 | Stamatakis | H04W 8/005 |
| 10,084,638 | B2* | 9/2018 | Breed | H04L 67/12 |
| 10,171,893 | B2* | 1/2019 | Tan | H04Q 9/00 |
| 10,565,566 | B1* | 2/2020 | Davis | G06Q 10/20 |
| 10,715,885 | B2* | 7/2020 | Tan | H04Q 9/00 |
| 2004/0133314 | A1 | 7/2004 | Ehlers et al. | |
| 2006/0168972 | A1 | 8/2006 | Fry | |
| 2007/0033511 | A1* | 2/2007 | Davies | G06F 11/181 714/799 |
| 2009/0289506 | A1* | 11/2009 | Harres | G08C 17/04 307/104 |
| 2010/0189135 | A1* | 7/2010 | Garneau | H04Q 9/00 370/498 |
| 2010/0328143 | A1* | 12/2010 | Kirk | G01W 1/04 342/26 B |
| 2011/0092164 | A1* | 4/2011 | Spanhake | H04W 40/10 455/67.11 |
| 2011/0154497 | A1* | 6/2011 | Bailey, Jr. | H04L 63/1408 726/25 |
| 2012/0016976 | A1* | 1/2012 | Voellmann | G06F 16/178 709/223 |
| 2012/0180055 | A1 | 7/2012 | Brech et al. | |
| 2012/0246261 | A1* | 9/2012 | Roh | H04L 67/36 709/217 |
| 2012/0259652 | A1* | 10/2012 | Mallon | G06F 19/3418 705/2 |
| 2013/0098599 | A1 | 4/2013 | Busch et al. | |
| 2013/0124081 | A1* | 5/2013 | Khosravy | H04W 4/029 701/408 |
| 2013/0265064 | A1* | 10/2013 | Hamann | G01N 17/04 324/700 |
| 2013/0278377 | A1 | 10/2013 | Slupsky et al. | |
| 2013/0318188 | A1* | 11/2013 | Liekens | H04L 67/12 709/206 |
| 2014/0002239 | A1 | 1/2014 | Rayner | |
| 2014/0062669 | A1 | 3/2014 | Mena et al. | |
| 2014/0140254 | A1* | 5/2014 | Nieminen | H04W 4/70 370/311 |
| 2014/0347193 | A1* | 11/2014 | Ljung | H04L 67/12 340/870.01 |
| 2015/0134123 | A1 | 5/2015 | Obinelo | |
| 2015/0208142 | A1* | 7/2015 | Gladigau | H04Q 9/00 340/870.07 |
| 2015/0295784 | A1 | 10/2015 | Kim et al. | |
| 2015/0309493 | A1 | 10/2015 | Patel et al. | |
| 2015/0331977 | A1* | 11/2015 | Healey | G06F 17/5009 703/2 |
| 2015/0381737 | A1* | 12/2015 | Quinn | H04L 67/1095 709/217 |
| 2016/0050264 | A1* | 2/2016 | Breed | H04L 67/2819 709/217 |
| 2016/0098305 | A1* | 4/2016 | Bucsa | H04L 67/20 719/318 |
| 2016/0133108 | A1* | 5/2016 | Bucsa | H04L 67/12 340/629 |
| 2016/0212509 | A1* | 7/2016 | Ljung | H04L 67/12 |
| 2016/0282819 | A1 | 9/2016 | Zeier | |
| 2017/0013069 | A1 | 1/2017 | Grohman | |
| 2017/0018042 | A1 | 1/2017 | Pudipeddi et al. | |
| 2017/0097259 | A1 | 4/2017 | Brown et al. | |
| 2017/0124669 | A1* | 5/2017 | Finkel | G06Q 10/06315 |
| 2017/0149900 | A1* | 5/2017 | Moriguchi | H04L 67/10 |
| 2017/0176033 | A1 | 6/2017 | Tan et al. | |
| 2017/0176039 | A1 | 6/2017 | Liu et al. | |
| 2017/0177762 | A1 | 6/2017 | Liu et al. | |
| 2017/0180913 | A1* | 6/2017 | Tan | H04W 4/70 |
| 2017/0188121 | A1 | 6/2017 | Tan et al. | |
| 2018/0048395 | A1* | 2/2018 | Brinker | H04Q 9/00 |
| 2018/0077882 | A1* | 3/2018 | Gilliam | A01G 25/165 |
| 2018/0279111 | A1* | 9/2018 | Stamatakis | H04W 8/005 |
| 2018/0288158 | A1* | 10/2018 | Nolan | H04L 67/12 |
| 2018/0322454 | A1* | 11/2018 | Komoni | G06Q 10/0833 |
| 2018/0367366 | A1* | 12/2018 | Breed | H04L 67/2819 |

OTHER PUBLICATIONS

Tan et al., U.S. Appl. No. 62/269,902, filed Dec. 18, 2015; 8 pages.
Tan et al. U.S. Office Action dated Nov. 1, 2017, directed to U.S. Appl. No. 15/382,017; 7 pages.
Liu et al. U.S. Office Action dated Apr. 6, 2018 directed to U.S. Appl. No. 15/382,000; 11 pages.
Liu et al. U.S. Office Action dated Jan. 2, 2018 directed to U.S. Appl. No. 15/382,058; 10 pages.
Tan et al., U.S. Office Action dated Jul. 11, 2018, directed to U.S. Appl. No. 15/382,378; 65 pages.
Tan et al. U.S. Office Action dated Jan. 18, 2019, directed to U.S. Appl. No. 15/382,378; 63 pages.
Tan et al., U.S. Office Action dated Jul. 3, 2019 directed to U.S. Appl. No. 15/382,378; 85 pages.

* cited by examiner

INTELLIGENT MULTI-CHANNEL WIRELESS DATA ACQUISITION GATEWAY

CROSS-REFERENCE TO RELATED APPLICATION

This application claims the benefit of U.S. Provisional Application No. 62/269,908, filed on Dec. 18, 2015, the entire contents of which is incorporated herein by reference.

FIELD OF THE INVENTION

The present invention relates to a gateway for the internet of things (IoT) and, more particularly, to the intelligent gateway for IoT in mission critical facilities.

BACKGROUND OF THE INVENTION

Most of the routers in the market today only receive and transmit data using a pre-defined protocol, such as WIFI, ZigBee, Bluetooth, etc. These routers do not analyze data and or determine which data to transmit. In mission critical facilities like data centers there are many metal boxes such as racks of servers that tend to block the signal transmission.

SUMMARY OF THE INVENTION

In accordance with the present invention, there is provided an intelligent gateway which can receive multiple sensors' data using sub-1 G Hz frequency, analyze data, and transmit processed data to a database server. The intelligent gateway can receive data from up to 100 sensors using sub-1 G Hz (433, 868 or 915 MHz) wireless frequency. The received data can be analyzed to determine which data packages to transmit and when to transmit the packages to a database server. The intelligent gateway can also receive feedback and instructions from the database server. The processed data can be transmitted to the database server with different protocols like WIFI, Ethernet and RS485. The intelligent gateway may also be integrated with multiple sensors like a temperature and humidity sensor, pressure sensor, air speed sensor and particulate matter less than 2.5 micro meters (PM2.5) sensor. These sensors are for collecting additional indoor environmental quality parameters. The gateway may work with sensors as described in U.S. Provisional Application Ser. No. 62/269,902, entitled "Battery-Powered Wireless Long Life Temperature and Humidity Sensor Module." The intelligent gateway can use an adaptive algorithm to receive data from these wireless sensors, and accept event based sensor data transmissions.

In some embodiments, a data acquisition gateway for receiving data from multiple wireless sensors, analyzing the data, and transmitting it to a server, includes a memory, one or more processors, one or more programs, wherein the one or more programs are stored in the memory and configured to be executed by the one or more processors, the one or more programs including instructions for: receiving data from a plurality of sensors, analyzing the data at the gateway to determine whether the data is new data, adding the data to a data package if it is determined that the data is new data. The gateway can also include one or more sensors for measuring air temperature, relative humidity, absolute air pressure, or particulate matter, one or more communication modules for providing data communication through RS485 protocol, Ethernet protocol, or WIFI protocol, and a sub-1 G Hz receiver.

In some embodiments, the data acquisition gateway further comprises a vent to dissipate heat from the gateway. In some embodiments, the one or more programs are configured to store sensor data in the memory for at least 1 day. In some embodiments, the one or more programs are configured to store sensor data in the memory for at least 10 days. In some embodiments, the one or more programs are configured to store sensor data in the memory for at least 30 days. In some embodiments, the data acquisition gateway comprises sensors for measuring air temperature, relative humidity, absolute air pressure, and particulate matter. In some embodiments, the data acquisition gateway comprises an air speed sensor configured to measure airspeeds of less than 10 m/s. In some embodiments, the data acquisition gateway of claim 1 comprises a particulate matter sensor configured to measure particulate matter with a diameter of less than 2.5 micro meters. In some embodiments, the data acquisition gateway comprises one or more communication modules for providing data communication through RS485 protocol, Ethernet protocol, and WIFI protocol.

In some embodiments, the data acquisition gateway comprises a I2C data communication, high sensitivity temperature and humidity sensor. In some embodiments, the data acquisition gateway comprises an absolute air pressure. In some embodiments, the data acquisition gateway comprises an air speed sensor comprising a hot wire based sensor. In some embodiments, the data acquisition gateway comprises a PM2.5 particulate matte sensor. In some embodiments, the data acquisition gateway comprises an EEPROM memory. In some embodiments, the EEPROM is configured to save data for at least 30 days. In some embodiments, the data acquisition further comprises determining whether the data comprises warning information. In some embodiments, the data acquisition gateway further comprises immediately sending the data to the server if it is determined that the data comprises warning information.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION OF THE INVENTION

Described is an intelligent gateway which can receive data from a plurality of sensors using a sub-1 G Hz frequency. A sub-1 G Hz frequency data transmission system is preferred to receive data from many (more than 10, more than 20, more than 50) and up to 100 wireless sensors. The described intelligent gateway can receive multiple sensor data using sub-1 G Hz frequency, analyze the data, and transmit processed data to a database server. The gateway can support several different types of sensors and may use a low power wireless receiver that has a sub-1 G Hz frequency. The gateway can use known protocols to transmit the data to a database server through a network router such as WIFI/Ethernet/RS485.

Figure 1:
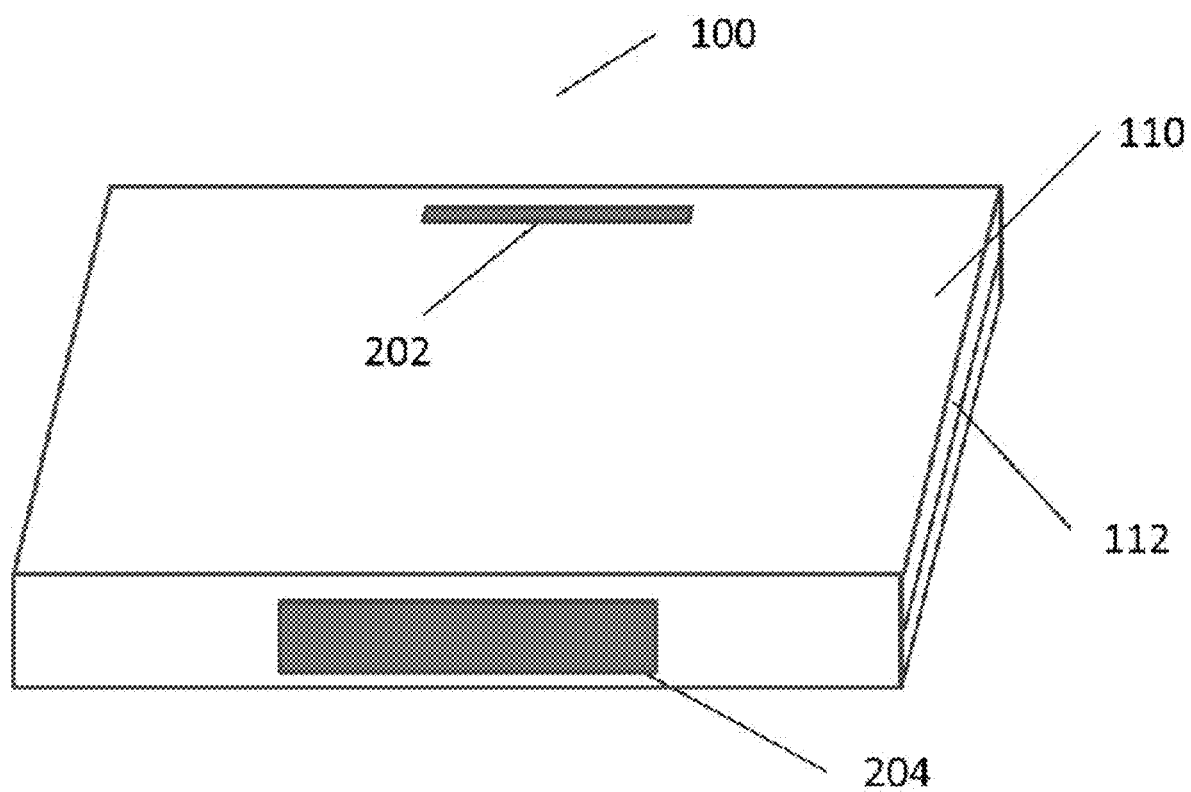
FIG. 1 is a perspective view of an intelligent multi-channel wireless data acquisition gateway.
Figure 2:
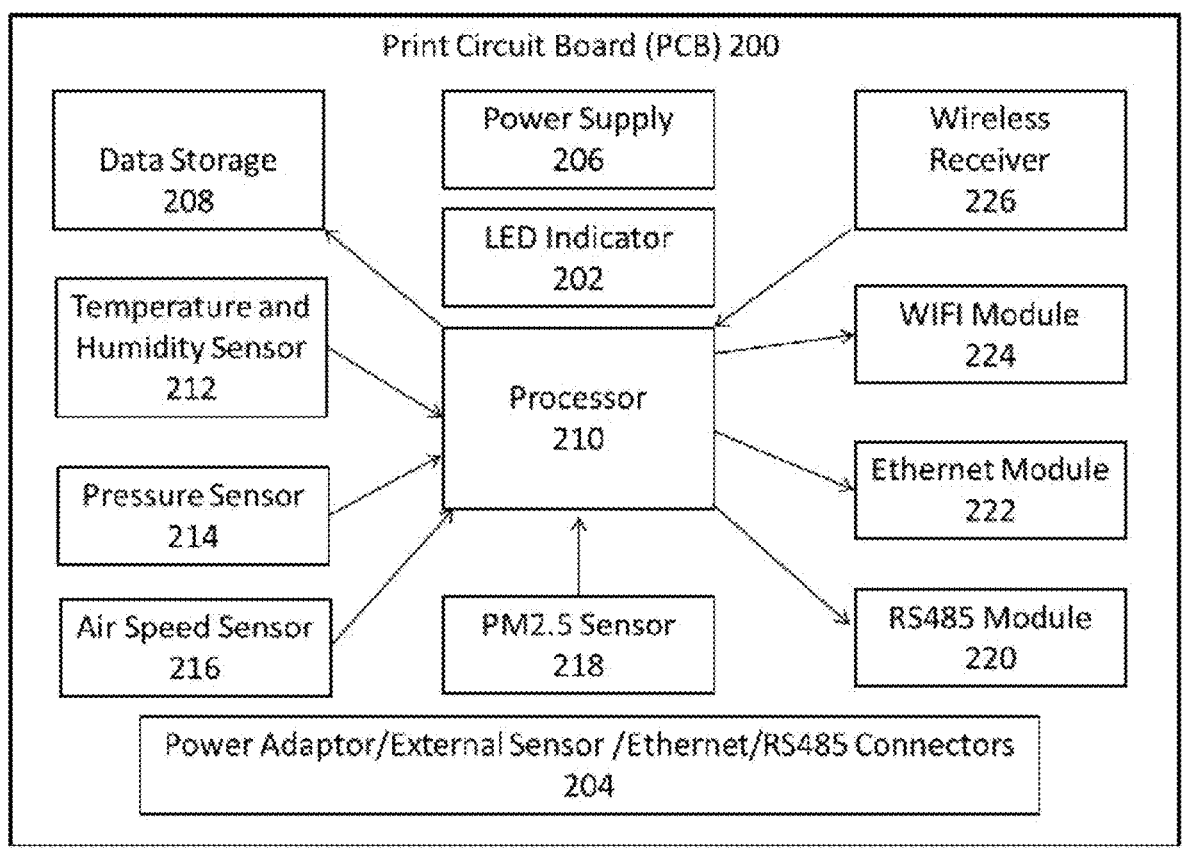
FIG. 2 is a detail view of a print circuit board.

FIG. 1 is a perspective view of an intelligent multi-channel wireless data acquisition gateway 100. FIG. 2 shows a circuit board of the multi-channel wireless data acquisition gateway. The intelligent multi-channel wireless data acquisition gateway 100 is designed to receive data from multiple wireless sensors, analyze the data, and transmitting it to a database server. According to some embodiments, the gateway 100 includes an enclosure 110, two air vent grills 112, a power indicator 202, power and communication connectors 204. The enclosure 110 can be formed from a rigid plastic and can include one or more pieces. The enclosure includes one or more air vent grills 112, for creating an air path to dissipate the heat generated by the print circuit board 200. The air vent grills can be formed as part of the enclosure or can be rigidly connected to said enclosure 110. The power indicator 202 can include one or more LED indicators, for showing whether the intelligent gateway 100 is working properly. The power and communication connectors 204 can be standard connectors for connecting external wires, connecting power to the print circuit board 200, connecting external sensor, and sending data out to the Ethernet and RS485 routers.

The circuit board 200 of the gateway 100 shown in FIG. 2 includes a power supply 206. The power supply 206 can be a power supply and management circuit, for providing adequate power (3V and 5V) to various components of the print circuit board 200, rigidly connected to said power and communication connectors 204, and rigidly linked to said power indicator 202. The circuit board also includes a data storage 208 such as an electrically erasable programmable read-only memory (EEPROM), and/or a non-volatile memory such as a flash memory device. In some embodiments, the data storage 208 is an EEPROM, for saving data for at least 30 days in case of network failure.

The circuit board also includes a processor 210. The processor 210 is a microcontroller, for processing received data, implementing calculations and sending control signals, an example of such a processor includes STMicroelectronics STM32. The circuit board 200 can also include a variety of sensors such as temperature and humidity sensor 212, a pressure sensor 214, an air speed sensor 216, a PM2.5 sensor 218. The temperature and humidity sensor 212 can be a high accuracy sensor, I2C data communication, high sensitivity, for measuring air temperature and relative humidity. An example of such a sensor 212 is SENSIRION AG SHT21. The pressure sensor 214 is of high accuracy, small form factor, for measuring air absolute pressure. An example of such a sensor 214 is STMicroelectronics LPS25. The air speed sensor 216 is a hot wire based sensor, high accuracy, high sensitivity, for measuring air speed in low airflow speed range (0-10 m/s), rigidly wired to said power and communication connectors 204. An example of such a sensor 216 is Maxthermo MFTS07-1061. The PM2.5 sensor 218 is rigid, with fan, high sensitivity, for measuring particulate matter with diameter of less than 2.5 micro meters. An example of such a sensor 218 is Plantower PMS5003.

The circuit board 200 can also have one or more communication modules, preferably, the circuit board 200 incudes a plurality of communication modules including a RS485 module, an Ethernet module 222, a WIFI module 224 and a sub-1 G Hz wireless receiver 226. The RS485 module 220 is rigid, small form factor, for providing data communication through RS485 protocol. An example of such a module 220 is a TI SN65HVD. The Ethernet module 222 is a high speed module, for providing data communication through the Ethernet protocol. An example of such a module 222 is a USR K1. The WIFI module 224 can be a module with an external antenna for providing data communication through WIFI protocol. An example of such a module 224 is a Hanfeng HF-LPT100. The sub-1 G Hz wireless receiver 226 can be a module with an external antenna that has high sensitivity, for receiving data from a sub-1 G Hz transmitter. Examples of such a module 224 are Anaren Integrated Radio (AIR) A1101R04C with Antenna 66089-0406 and AIR A110LR09C with Antenna 66089-8906.

Figure 3:
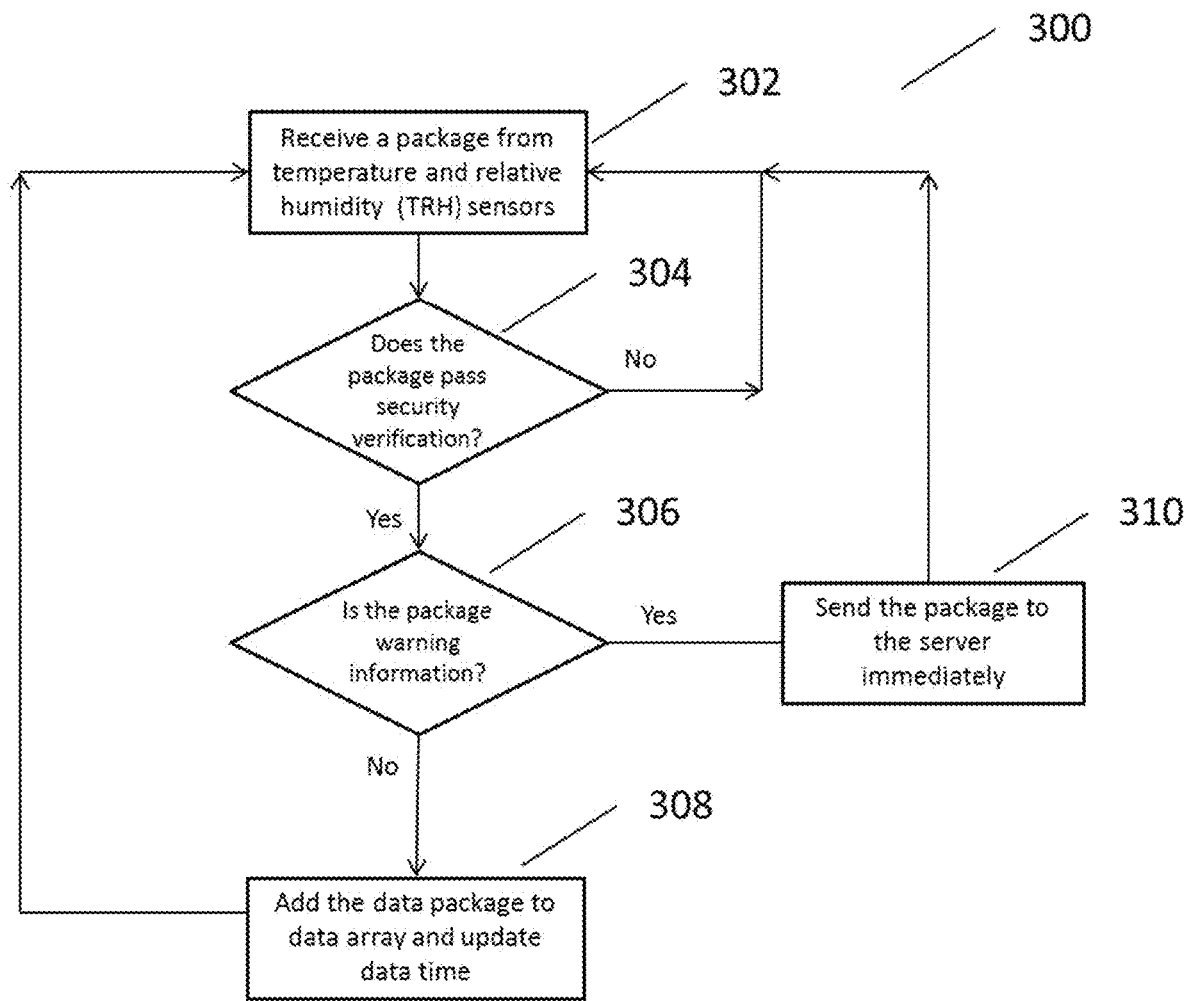
FIG. 3 is a detail view of a data receiving interruption work flow.
Figure 4:
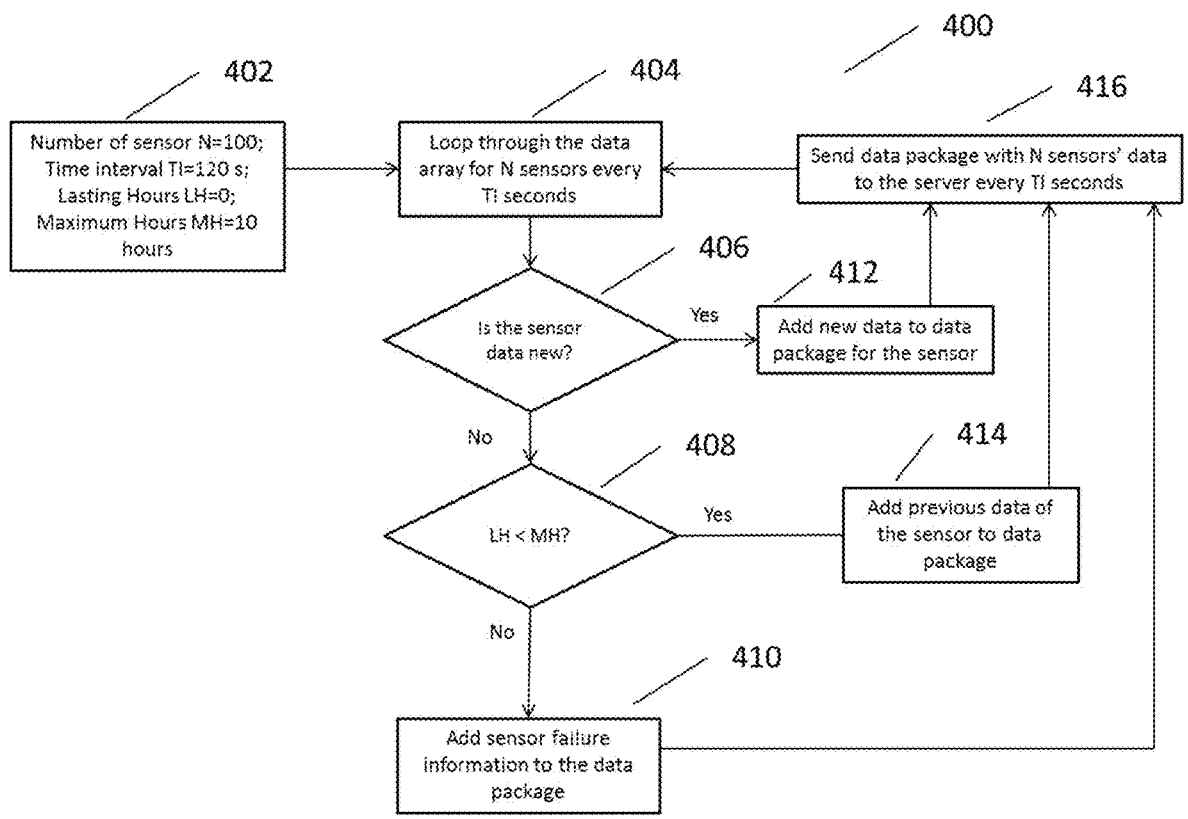
FIG. 4 is a detail view of a data analyzing loop work flow.

A detail view of a data receiving interruption process 300 according to some embodiments is shown in FIG. 3, and a detail view of the data analyzing loop work process 400 according to some embodiments is shown in FIG. 4. Programming to implement these workflows can be stored on system memory, for example data storage 208 and can be implemented using processor 210.

As shown in FIG. 3, a data receiving interruption process 300 can begin at with receiving a data package from a wireless sensor, such as one of a plurality of temperature and humidity sensors at 302. The gateway then determines if the package passes security verification at 304. Security verification 304 can include sensor ID and data cyclic redundancy check (CRC) verifications. If the package passes the security verification the gateway next determines if the package includes warning information at 306. This warning information may include, for example, a low sensor battery warning and/or sensor failure information. If the package includes warning information, the package is immediately sent to the server at 310, the process then returns to step 302. If the package does not include warning information, the data package is added to the data array and the data time is updated at 308. The process 300 then returns to step 302. The data array is a memory block used to store data and data time for a plurality (up to 100) of wireless temperature and humidity sensors and a variety of embedded sensors such as temperature and humidity sensor 212, a pressure sensor 214, an air speed sensor 216, a PM2.5 sensor 218. The data time, for example, can be a time stamp for received data.

FIG. 4 shows a process 400 for analyzing data in the gateway according to some embodiments. The process starts at 402, where the number of sensors is set to the number of sensors connected to the gateway (here 100), the time interval TI is set to 120 seconds, the lasting hours LH is to 0 and the maximum hours MH is set to 10 hours. TI is the time interval between each transmission of data to the database server. The TI should be adjustable. The LH is the lasting hours that a sensor's data is not updated. The MH is the maximum allowed hours that a sensor's data is not updated. The MH is preferably adjustable. Next at 404 the gateway loops through the data array for N sensors every TI seconds. At 406 it is determined whether the sensor data is new. If the sensor data is new, the new data is added to the data package for the sensor. The data package can be a memory block to store all sensors' data that will be sent to the database server. The data package with the N sensors data is then sent to the server every TI seconds at 416. At 406 if the second data is not new data the process proceeds to step 408 where it is determined whether LH<MH. If LH<MH the previous data of the sensor is added to the data package at 414 before proceeding to 416. At 408 if LH is not <MH sensor failure information is added to the data package at 410 before proceeding to 416. Sensor failure information indicates that a sensor is not working or missed for MH hours.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A data acquisition gateway, comprising:
a sub-1 GHz frequency receiver;
memory;
one or more processors;
one or more programs, wherein the one or more programs are stored in the memory and configured to execute by the one or more processors, the one or more programs including instructions for:
 receiving, via the sub-1 GHz frequency receiver, data from a plurality of sensors that are configured to measure air temperature, relative humidity, absolute air pressure, or particulate matter;
 for each sensor from the plurality of sensors:
  determining whether the data satisfies a security verification, the security verification comprising a sensor identification verification and a cyclic redundancy check verification,
  in response to determining that the data satisfies the security verification, determining whether the data includes warning information, wherein if the data includes the warning information then immediately sending the data to a server, and wherein if the data does not include the warning information then storing the data and an associated data time in a data array,
  performing an analysis of the data stored in the data array, the analysis comprising:
   if the data in the data array is new data, storing the new data in a data package for the sensor,
   if the data in the data array is not the new data and a last time that the data was updated is less than a predetermined maximum time, identifying the data as previous data and storing the previous data in the data package for the sensor, and
   if the last time that the data was updated is greater than the predetermined maximum time, adding sensor failure information to the data package for the sensor; and
one or more communication modules configured to transmit the data package to the server at a predetermined time interval, wherein the data package comprises the new data, the previous data, and the sensor failure information from the plurality of sensors.

2. The data acquisition gateway of claim 1, further comprising a vent to dissipate heat from the gateway.

3. The data acquisition gateway of claim 1, wherein the one or more programs are configured to store the data in the memory for at least 1 day.

4. The data acquisition gateway of claim 1, wherein the one or more programs are configured to store the data in the memory for at least 10 days.

5. The data acquisition gateway of claim 1, wherein the one or more programs are configured to store the data in the memory for at least 30 days.

6. The data acquisition gateway of claim 1, wherein the data acquisition gateway comprises embedded sensors, wherein the embedded sensors measure one or more of air temperature, relative humidity, absolute air pressure, and particulate matter.

7. The data acquisition gateway of claim 1, comprising an air speed sensor configured to measure airspeeds of less than 10 m/s.

8. The data acquisition gateway of claim 1, comprising a particulate matter sensor configured to measure particulate matter with a diameter of less than 2.5 micro meters.

9. The data acquisition gateway of claim 1, comprising one or more communication modules for providing data communication through RS485 protocol, Ethernet protocol, and WIFI protocol.

10. The data acquisition gateway of claim 1, comprising a I2C data communication, high sensitivity temperature and humidity sensor.

11. The data acquisition gateway of claim 1, comprising an air speed sensor comprising a hot wire based sensor.

12. The data acquisition gateway of claim 1, wherein the memory comprises an EEPROM memory.

13. The data acquisition gateway of claim 12, wherein the EEPROM is configured to save the sensor data for at least 30 days.

14. The data acquisition gateway of claim 1, wherein the warning information comprises one or more of a warning message indicating low sensor battery and a warning message indicating sensor failure.

* * * * *